United States Patent [19]

Chikuma et al.

[11] Patent Number: 5,147,009
[45] Date of Patent: Sep. 15, 1992

[54] STEERING FORCE CONTROL APPARATUS OF POWER STEERING SYSTEM

[75] Inventors: Isamu Chikuma; Hiroshi Eda, both of Maebashi, Japan

[73] Assignee: Nippon Seiko Kabushiki Kaisha, Tokyo, Japan

[21] Appl. No.: 692,305

[22] Filed: Apr. 26, 1991

[30] Foreign Application Priority Data

Apr. 27, 1990 [JP] Japan ............................ 2-44553[U]
Apr. 27, 1990 [JP] Japan ................................ 2-110503

[51] Int. Cl.$^5$ ........................................... B62D 5/06
[52] U.S. Cl. .................................. 180/143; 91/375 A; 91/434
[58] Field of Search ................... 180/141, 142, 143; 91/375 P, 434

[56] References Cited

U.S. PATENT DOCUMENTS

| | | | |
|---|---|---|---|
| 3,877,540 | 4/1975 | Masuda et al. | 180/79.2 R |
| 4,637,484 | 1/1987 | Ijiri et al. | 91/434 |
| 4,715,464 | 12/1987 | Nakamura et al. | 180/143 |
| 4,730,687 | 3/1988 | Chikuma et al. | 180/142 |
| 4,784,235 | 11/1988 | Ijiri et al. | 91/434 |
| 4,790,401 | 12/1988 | Sonoda | 91/434 |

FOREIGN PATENT DOCUMENTS

| | | | |
|---|---|---|---|
| 50-59930 | 5/1975 | Japan . | |
| 53-8086 | 3/1978 | Japan . | |
| 61-155058 | 7/1986 | Japan . | |
| 2042443 | 9/1980 | United Kingdom | 180/143 |

*Primary Examiner*—H. Grant Skaggs
*Attorney, Agent, or Firm*—Basile and Hanlon

[57] ABSTRACT

A steering reaction force generating mechanism for generating a reaction force acting on an input shaft is provided within a cylindrical space of a housing between a lower end portion of the input shaft and an upper end portion of a pinion shaft (output shaft). The steering reaction force generating mechanism includes an input shaft accommodating section for accommodating the lower end of the input shaft together with its two control arms which protrude symmetrically and radially therefrom. A pair of reaction force chambers are provided at both sides of the input shaft accommodating section in parallel with the two control arms. Two pairs of through bores are formed respectively between one of the reaction force chambers and the input shaft accommodating section, and between the other of the reaction force chambers and the input shaft accommodating section. Two pairs of plungers are respectively disposed in the through bores so that each plunger is slidable in its axial direction toward and away from the control arm of the input shaft. The movement of each plunger is restricted by a pin inserted into a further through bore formed in the plunger extending in a direction orthogonal to the axis of the plunger. The inner peripheral surface of the through bore and the outer peripheral surface of the plunger can be ground easily and accurately to insure smooth movement of the plunger.

4 Claims, 4 Drawing Sheets

STEERING FORCE CONTROL APPARATUS OF POWER STEERING SYSTEM

BACKGROUND OF THE INVENTION

1. Field of the Invention

The present invention relates to a power steering system of a vehicle and, in particular, to a steering force control apparatus for a power steering system in which the steering torque of an input shaft which performs steering is calculated by detecting a physical quantity factor which varies depending on a vehicle travelling condition and a steering condition. The steering torque is made variable in accordance with a change in the physical quantity factor.

2. Description of the Prior Art

Prior art steering force control apparatus for a power steering system of this type are disclosed, for example, in Japanese Patent Publication No. 53-8086, Japanese Patent Laid-Open Publication No. 50-59930 and U.S. Pat. No. 3,877,540.

In these steering force control apparatus, plungers are provided as a steering reaction force generating mechanism in which the plungers abut a pair of projections formed symmetrically on an input shaft respectively in both sides of a direction of rotation of the input shaft to thereby generate a force couple in a forward direction of rotation and a reverse direction of rotation of the input shaft. Thus, during travelling of the vehicle at high speeds, a steering reaction force is applied to an input and an appropriate steering force is obtained in response to a travelling condition of the vehicle.

Furthermore, a control apparatus which is applicable to the steering force control apparatus of a power steering system is disclosed, for example, in U.S. Pat. No. 4,730,687 (Japanese Patent Laid-Open Publication No. 61-155058) which was proposed previously by the Applicant's company.

In this prior art apparatus, a variable orifice is placed in a supply passage which supplies a predetermined flow rate of working fluid supplied from a hydraulic pump. The position of the variable orifice is controlled by a control signal from a controller which sets a steering force based on a detection signal of a detecting means for detecting a physical quantity factor which is varied depending on travelling and steering conditions of a vehicle. Thus, the supply passage is split into two passages by the variable orifice in accordance with the control signal. The working fluid of one of the two passages is supplied through a passage change-over valve to a steering assisting force generating mechanism for generating a steering assisting force. The working fluid of the other passage is supplied through the passage changeover valve to a steering reaction force generating mechanism for generating a steering reaction force. As a result, a steering force control apparatus of a power steering system is provided in which a large change in an input/output characteristic is obtained, the sensitivity for steering feeling is sharp, and the consumption of energy is relatively low.

However, in the prior art steering force control apparatus of a power steering system, in the steering reaction force generating mechanism, accommodating holes for slidably accommodating the plungers which generate a force couple in a reverse direction with respect to a steering direction of the input shaft are formed as bottom-provided holes and, in particular, it is difficult to grind a deep endmost portion in which the plungers slide. As a result, a problem is involved in that smooth operation of the plungers is not insured.

To solve this problem, it is considered to make the plunger accommodating holes in the form of through bores, and to provide flanges serving as the stoppers at an end of the plungers. However, in this case, another problem is caused in that since the flanges are formed on an outer peripheral surface of the plungers, the outer peripheral surfaces of the flanges cannot be ground accurately.

Furthermore, in the prior art control apparatus applicable to the steering force control apparatus, since the variable orifice is structured in that a spool for controlling the flow rate of the split passages is operated by a proportional, solenoid operated valve in proportion to a control signal from a controller and is directly controlled with respect to its sliding position, it is impossible to increase a driving force for the sliding position control of the spool. As a result, there is a problem in that an accurate position control is difficult when the sliding resistance of the spool is increased due to adherence of dust or the like to the sliding surface of the spool.

SUMMARY OF THE INVENTION

The present invention was made in view of the problems in the prior art and it is an object of the present invention to provide a steering force control apparatus of a power steering system which allows plungers and accommodating holes or bores for accommodating the plungers to be accurately ground.

Another object of the present invention is to provide a steering force control apparatus of a power steering system which can drive a spool with a large driving force and can accurately control the sliding position of the spool.

In one aspect of the present invention, a steering force control apparatus of a power steering system comprises an output shaft connected to a steering mechanism, an input shaft connected to the output shaft so as to be relatively displaceable in accordance with a steering torque applied to the output shaft, a steering assisting force generating mechanism for generating a steering assisting force in accordance with the amount of relative displacement between the input shaft and the output shaft, a steering reaction force generating mechanism formed between the input shaft and the output shaft, and a control apparatus for controlling the steering assisting force generating mechanism and the steering reaction force generating mechanism. The steering reaction force generating mechanism includes a pair of reaction force chambers formed in opposing surfaces of one of the input shaft or the output shaft, an accommodating section formed between the reaction force chambers for accommodating a protruding control arm formed on the other of the input shaft or the output shaft, through bores penetrating between each of the reaction force chambers and the accommodating section, plungers slidably disposed in the through bores, and a movement restricting mechanism for restricting movement of the plungers. The movement restricting mechanism includes additional through bores respectively formed in the plungers to extend orthogonally with an axial direction of the plungers and movement restricting pins respectively inserted into the additional through bores.

The control apparatus includes a fluid control valve for controlling a working fluid to be supplied to the steering assisting force generating mechanism and the steering reaction force generating mechanism, and a controller for controlling the fluid control valve in accordance with a detection signal of a detecting means for detecting a physical quantity factor which is varied depending on a travelling condition and a steering condition of a vehicle. The fluid control valve includes a spool slidably disposed in a housing, and a first pressure chamber and a second pressure chamber respectively formed on both sides of a partition formed on the spool. The first pressure chamber is supplied with fluid which is supplied to the steering force control valve, and the second pressure chamber is supplied with a supply fluid. A fluid passage which communicates with the second pressure chamber is formed in the spool to supply the supply fluid to the steering force control valve. A variable choke is formed by the fluid passage and a control rod which is position controlled in accordance with the control signal.

In the steering force control apparatus of a power steering system described above, in the steering reaction force generating mechanism for generating a steering reaction force to the input shaft, the through bores are formed between the pair of reaction force chambers formed in one of the input shaft and the output shaft and the accommodating section for accommodating the control arm formed on the other of the input shaft and the output shaft. The plungers are slidably disposed in the through bores. As a result, the inner peripheral surfaces of the through bores and the outer peripheral surfaces of the plungers can be easily ground so that the plungers can be operated smoothly.

Furthermore, in the control apparatus, the fluid control valve for controlling the amount of working fluid supplied to the steering assisting force generating mechanism and the steering reaction force generating mechanism includes the first and second pressure chambers, the spool, and the variable orifice. The first pressure chamber is formed at one side of the spool and is supplied with the working fluid which is supplied to the steering force control valve. The second pressure chamber is separated from the first pressure chamber by the partition. The pressures of the first and second pressure chambers are changed by the variable orifice which includes the fluid passage formed in the spool and the control rod which is position controlled by the control signal from the controller. As a result of the change of the pressures in the first and second pressure chambers, the spool is slidingly moved by the thrust corresponding to this pressure difference. Accordingly, when dust or the like is adhered to the sliding surface of the spool and the sliding resistance of the spool increases and when the movement of the spool does not follow the position of the control rod, the pressure of the second pressure chamber is increased or decreased by the orifice as compared with the normal condition depending on the direction of movement of the control rod and, in response thereto, the pressure difference between the first and second pressure chambers is increased Thus, a driving force which is larger than the normal condition is applied to the spool and the spool is made to accurately follow the movement of the control rod.

DESCRIPTION OF THE PREFERRED EMBODIMENTS

Figure 1:
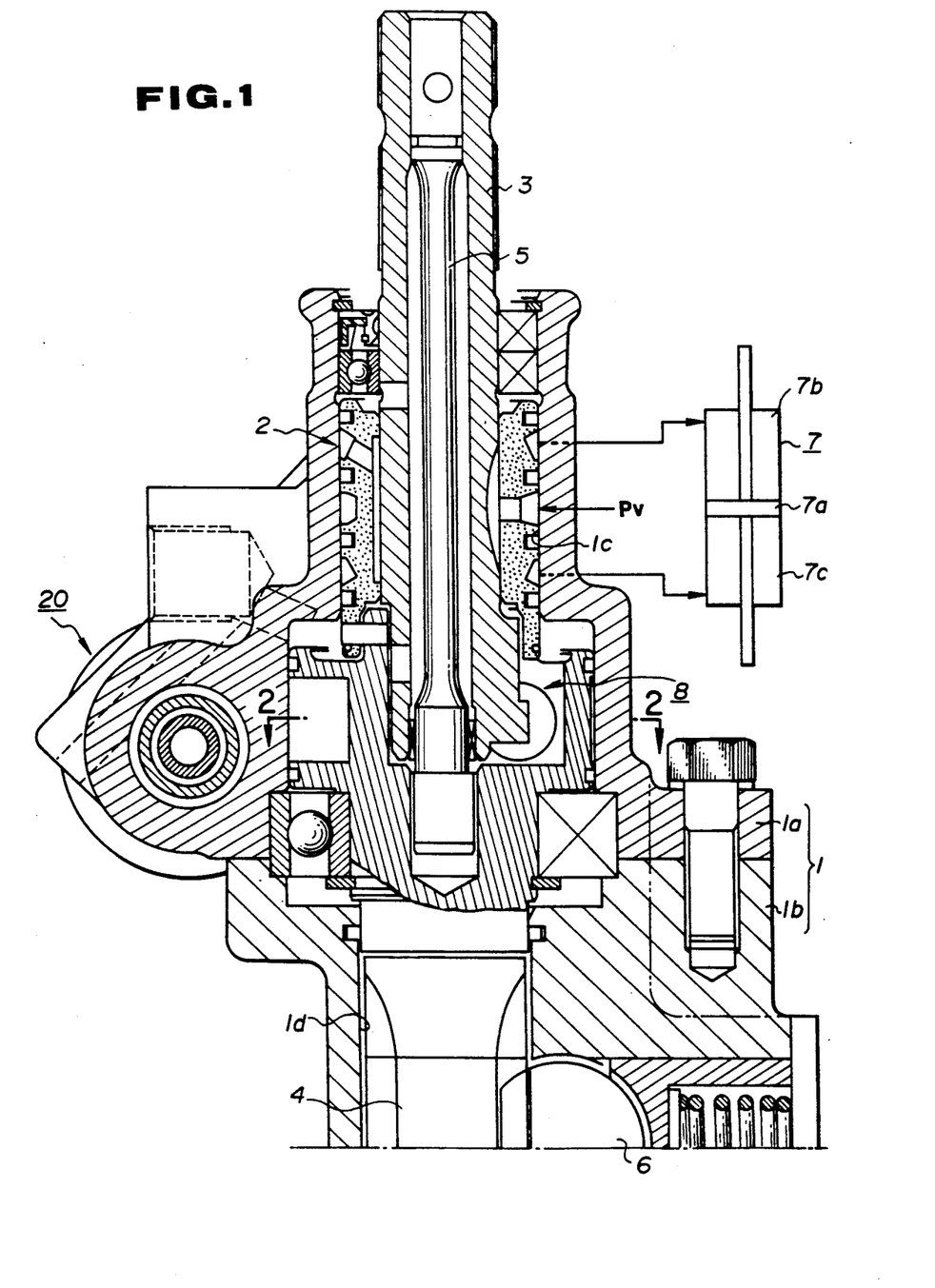
FIG. 1 is a longitudinal cross sectional view showing an embodiment of the present invention.
Figure 2:
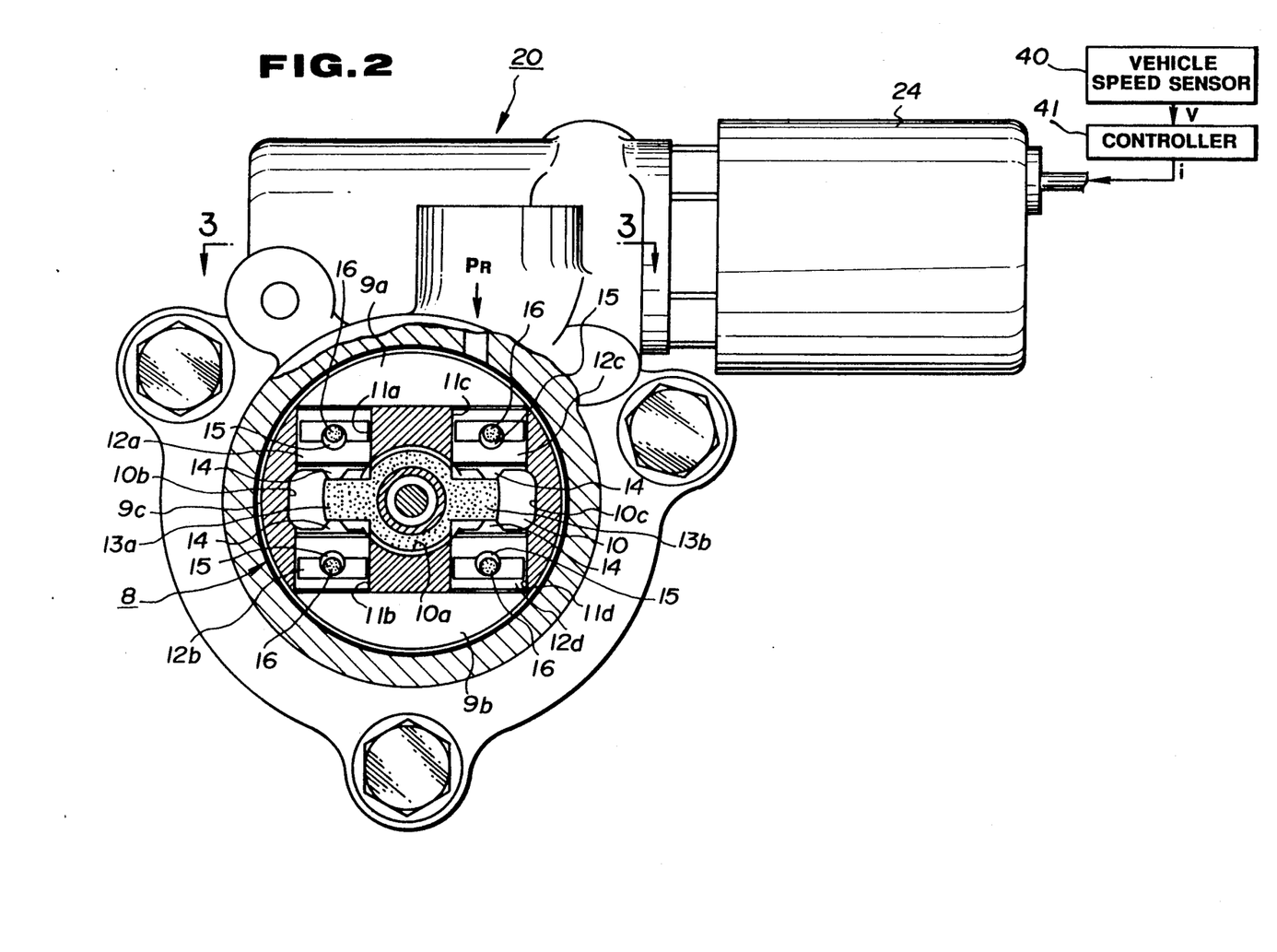
FIG. 2 is a cross sectional view taken along the line 2—2 in FIG. 1.
Figure 3:
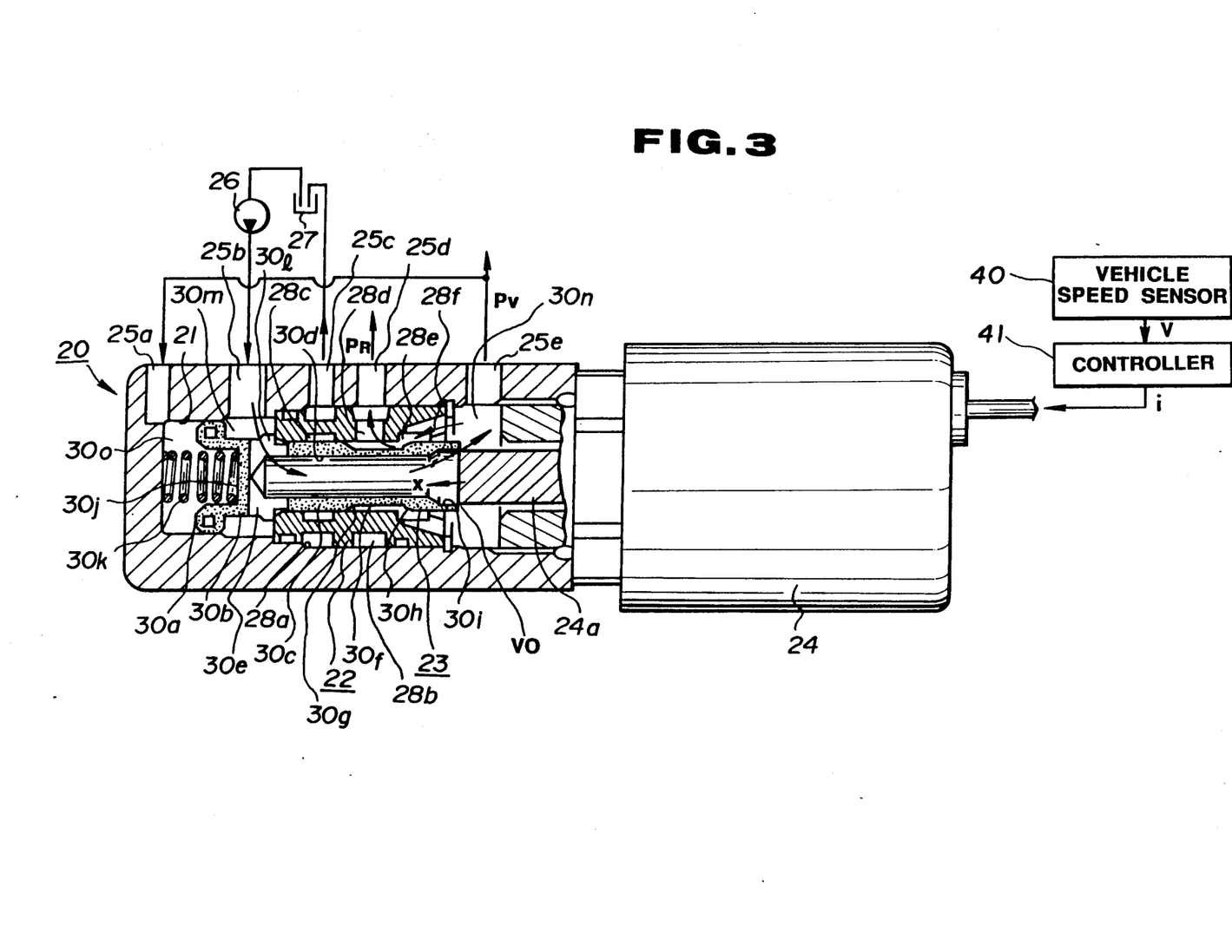
FIG. 3 is a cross sectional view taken along the line 3—3 in FIG. 2.

With reference to FIGS. 1 to 3, an embodiment of the present invention will be described.

First, with reference to FIG. 1, a housing 1 has an upper half body 1a and a lower half body 1b which are secured together by bolts. Center bores 1c and 1d are respectively formed coaxially in the upper half body 1a and the lower half body 1b. A rotary type steering force control valve 2 is rotatably disposed at an upper side of the center bore 1c of the upper half body 1a. A hollow input shaft 3 is rotatably supported in the inside of the rotary type steering force control valve 2. A pinion shaft 4 which is integrally rotated as an output shaft with the steering force control valve 2 is rotatably supported in the center bore 1d of the lower half body 1b. The input shaft 3 and the pinion shaft 4 are connected relatively rotatably by a torsion bar 5 and, at the same time, the pinion shaft 4 is engaged with a rack shaft 6 which serves as a steering mechanism. A steering assisting force generating mechanism for generating a steering assisting force for the rack shaft 6 is constituted by an energizing cylinder 7 having two pressure chambers 7b and 7c in accordance with a relative rotational displacement between the input shaft 3 and the pinion shaft 4 and supplies hydraulic oil to the selected pressure chamber to thereby generate an appropriate steering assisting force corresponding to a steering direction.

Furthermore, a steering reaction force generating mechanism 8 for generating a steering reaction force is formed between a lower end portion of the input shaft 3 and an upper end portion of the pinion shaft 4.

The steering reaction force generating mechanism 8, as shown in FIG. 2, includes a pair of reaction force chambers 9a and 9b having a bow cross section and formed in an outer peripheral portion of the upper end portion of the pinion shaft 4, an annular groove 9c formed in an inner surface of the housing for communicating the reaction force chambers 9a and 9b with each other, an input shaft accommodating section 10 including a circular recess 10a formed between the reaction force chambers 9a and 9b and including recesses 10b and 10c extending outwardly from symmetrical left and right outer peripheral portions of the circular recess 10a, through bores 11a and 11b formed between the reaction force chambers 9a, 9b and the recess 10b and through bores 11c and 11d formed between the reaction force chambers 9a, 9b and the recess 10c, plungers 12a to 12d respectively slidably disposed in the through bores 11a to 11d, and control arms 13a and 13b formed on a lower end of the input shaft 3 and respectively inserted into the recesses 10b and 10c of the input shaft accommodating section 10. Each of the plungers 12a to 12d has an engaging projection 14 on an end surface confronting the control arm 13a or 13b of the input shaft 3. Each plunger is further formed at an axial center portion with a further through bore 15 which is orthogonal with the axial direction. A movement restricting pin 16 having an outer diameter smaller than a diameter of the through bore 15 is formed in each of the through bores 11a to 11d for accommodating the plungers 12a to 12d, respectively. Each pin 16 is inserted into one of the through bores 15. As a result, the amount of movement of each of the plungers 12a to 12d in the axial direction is restricted by the pins 16. It is so designed that in a condition in which, in each of the plungers 12a to 12d, the movement restricting pin 16 is engaged with a side of the through bore 15 opposite to a side which is near the control arm 13a or 13b, the engaging projection 14 of each of the plungers 12a to 12d engages a side surface of the control arm 13a or 13b. Conversely, in a condition in which, in each of the plungers 12a to 12d, when the movement restricting pin 16 is engaged with the side of the through bore 15 near the control arm 13a or 13b, a back end side of each of the plungers 12a to 12d is not in contact with a side wall of the pinion shaft 4 defining the reaction force chamber 9a or 9b to thereby prevent the side wall defining the reaction force chamber 9a or 9b from being scratched by the back end of each of the plungers 12a to 12d.

A variable orifice valve 20 acting as a fluid control valve is formed at an outer peripheral portion of the housing 1 so that the variable orifice valve 20 extends in a direction orthogonal to an axial direction of the housing 1. The variable orifice valve 20 includes, as shown in FIG. 3, a spool accommodating bore 21 having a circular cross section and bored in a direction intersecting the axial direction of the housing 1, a cylindrical sleeve 22 fixed at a center portion of the spool accommodating bore 21, a spool 23 slidably disposed in the sleeve 22, and a solenoid 24 for controlling the sliding position of the spool 23.

The housing 1 is further formed with a feedback port 25a which extends from an outer peripheral edge portion of the housing 1 to a bottom of the spool accommodating bore 21, an input port 25b which reaches a bottom side of the sleeve 22, a return port 25c, a reaction force output port 25d which reaches an outer peripheral edge portion of the sleeve 22, and a steering output port 25e which reaches a solenoid side of the sleeve 22. The feedback port 25a is in communication with the steering output port 25e, and the input port 25b is connected to a hydraulic pump 26 which is driven, for example, by an external engine. The return port 25c is connected to an external tank 27. The reaction force output port 25d is connected to the reaction force chambers 9a and 9b of the steering reaction force generating mechanism 8. The steering output port 25e is connected to the steering force control valve 2.

The sleeve 22 is formed in an outer peripheral surface with annular grooves 28a and 28b which are respectively in communication with the return port 25c and the reaction force output port 25d. An annular groove 28c which is in communication with the annular groove 28a is formed in an inner peripheral surface. Furthermore, a through bore 28d is formed between the annular groove 28b and the inner peripheral surface, and an annular groove 28e is formed in the inner peripheral surface of the sleeve 22 at a right side of the through bore 28d. The annular groove 28e is opened at a right side surface through a through bore 28f.

The spool 23 includes a piston portion 30a which constitutes a partition wall slidably in contact with an inner surface of the variable orifice valve 20 between the feedback port 25a and the input port 25b of the spool accommodating hole 21, an intermediate diameter portion 30b having a smaller diameter than the piston portion 30a and confronting the input port 25b, and a small diameter portion 30c having a smaller diameter than the intermediate diameter portion 30b and having an outer peripheral surface slidably in contact with an inner peripheral surface of the sleeve 22. The spool 23 is formed with a center bore 30d from a right end surface. A through bore 30e is formed in the intermediate diameter portion 30b which is in communication with a bottom or left end of the center bore 30d. The small diameter portion 30c is formed with an annular groove 30f in an outer peripheral surface. Chamfered portions 30g and 30h are respectively formed at left and right end sides of the annular groove 30f. The center bore 30d has a large inner diameter portion 30i at a right end so that the inner diameter of the large inner diameter portion 30i is slightly larger than the diameter of a control rod 24a of the solenoid 24. The spool 23 is urged to the right by a coil spring 30k which is interposed between a bottom portion of the spool accommodating bore 21 and a recessed portion 30j formed in an end of the piston portion 30a. The sliding movement of the spool 23 to the right is restricted by a stopper 30l provided on an outer peripheral surface of the intermediate diameter portion 30b. The stopper 30l abuts against a left end edge of the sleeve 22. Under this condition, the annular groove 28e of the sleeve 22 is brought into communication with the through bore 28d through the chamfered portion 30h of the spool 23 and the annular groove 30f. When the spool 23 is moved to the left, the communication between the annular groove 28e of the sleeve 22 and the annular groove 30f of the spool 23 is interrupted and, instead, the through bore 28d of the sleeve 22 is brought into communication with the annular groove 28c via the annular groove 30f of the spool 23 and the chamfered portion 30g.

Figure 4:
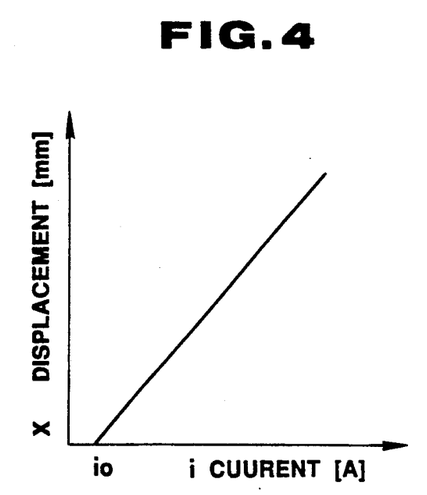
FIG. 4 is a diagram showing a relationship between displacement of the control rod and the exciting current of a solenoid of a variable orifice valve.

The solenoid 24 includes the control rod 24a whose movement or advancement is proportional to an exciting current supplied to the solenoid 24. The control rod 24a is urged to the right by a return spring (not shown) provided in the inside of the control rod 24a. A relation between a displacement x (an amount of advance) of the control rod 24a and an exciting current i is shown in FIG. 4. As shown in FIG. 4, the displacement x is maintained at zero until the exciting current i reaches a predetermined value io at which the exciting current produces a thrust to cope with a pressing force of the return spring and, after exceeding the predetermined value io, the displacement x is increased in proportion to an increase of the exciting current i.

Figure 5:
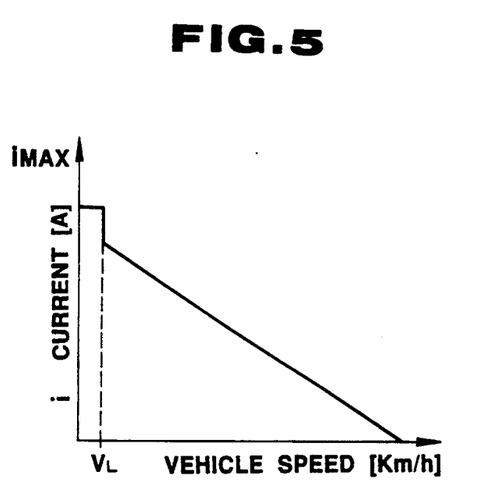
FIG. 5 is a diagram showing a relationship between the exciting current and a detected vehicle speed.

The solenoid 24 is supplied with the exciting current i from a controller 41, FIG. 3, which is, in turn, supplied with a vehicle speed detection value V from a vehicle speed sensor 40. The controller 41 supplies the solenoid 24 with a relatively large exciting current iMAX, FIG. 5, in a period from a time at which the vehicle speed detection value V is zero until the vehicle speed detection value V reaches a very low speed of $V_L$, that is, during a so-called steering while the vehicle is stopping and, when the vehicle speed exceeds the very low speed $V_L$, the exciting current i which decreases in inverse proportion to an increase in the vehicle speed detection value V is supplied to the solenoid 24.

The operation of the above embodiment will now be described. It is assumed that the vehicle is parked and an accessory switch is turned off. Under this condition, the controller 41 is in a non-operating condition and the exciting current i is zero. Accordingly, the control rod 24a of the solenoid 24 in the variable orifice valve 20 is at a withdrawn position by being urged to the right by the return spring as shown in FIG. 3. At this time, since the ignition switch is turned off, the engine is stopped and the hydraulic pump 26 is also inoperative. Thus, the amount of hydraulic oil supplied to the input port 25b of the variable orifice valve 20 is zero. As a result, the pressure in a second pressure chamber 30m formed between a left end of the sleeve 22 and the piston portion 30a of the spool 23 is zero. Since the pressure chamber 30n at a right side of the sleeve 22 and a first pressure chamber 30o at a left side of the spool 23 are in communication with each other, the pressures of both pressure chambers 30n and 30o are also zero. Thus, the spool 23 is at a position at which the stopper 30l abuts against the left end of the sleeve 22 by the force of the coil spring 30k. The pressure chamber 30n and the reaction force output port 25d are in communication with each other via the through bore 28f and the annular groove 28e of the sleeve 22, the chamfered portion 30h and the annular groove 30f of the spool 23, and an oil passage 28d and an annular groove 28b of the sleeve 22.

From this condition, when the accessory switch is turned on, electric power is supplied to the vehicle speed sensor 40 and the controller 41 to bring both into an operating condition. At this time, since the vehicle is stopped, the vehicle speed detection value V output from the vehicle speed sensor 40 is zero and the exciting current supplied from the controller 41 is iMAX. As a result, the control rod 24a of the solenoid 24 is advanced against the return spring and is inserted into the large inner diameter portion 30i of the spool 23. Thus, the center bore 30d is closed or blocked by the control rod 24a.

When the ignition switch is turned on to start the engine, the hydraulic pump 26 is driven and hydraulic oil is supplied to the input port 25b of the variable orifice valve 20. At this time, since the center bore 30d of the spool 23 is blocked by the control rod 24a, the pressure of the second pressure chamber 30m is increased and, when the thrust by this pressure exceeds the urging force by the coil spring 30k, the spool 23 is moved to the left. As a result, the communication between the pressure chamber 30n and the reaction force output port 25d is interrupted and, instead, the reaction force output port 25d and the return port 25c are brought into communication with each other. Thus, the hydraulic oil in the reaction force chambers 9a and 9b of the steering reaction force generating mechanism 8 is returned to the tank 27 and the steering reaction force to the input shaft 3 becomes zero. On the other hand, since the spool 23 moves to the left, the extreme end of the control rod 24a is drawn out of the large inner diameter portion 30i of the center bore 30d. Thus, the center bore 30d and the pressure chamber 30n are brought into communication with each other by a variable orifice VO constituted by the large inner diameter portion 30i and the control rod 24a and the pressure of the pressure chamber 30n and, accordingly, the pressure of the first pressure chamber 30o is increased.

The spool 23 is in an equilibrium condition when the following relation:

$$P_2 \times A = P_1 \times A + Kx \quad (1)$$

is satisfied, where A is the sectional area of the piston portion 30a of the spool 23, $P_2$ is the pressure of the second pressure chamber 30m, $P_1$ is the pressure of the first pressure chamber 30o, k is the spring constant of the coil spring 30k, and x is the displacement. Under this condition, the reaction force output port 25d and the return port 25c are maintained in the communication condition with each other and the entire amount of the hydraulic oil supplied from the hydraulic pump 26 is supplied to the steering force control valve 2. At this time, when the steering wheel is not turned while the vehicle is stopped, the steering force control valve 2 is a neutral position and the hydraulic oil is supplied to both of the pressure chambers 7b and 7c of the energizing cylinder 7. As a result, since the pressures of both the pressure chambers 7b and 7c are equal to each other, the piston rod 7a is stopped at a center position and the steering wheel is maintained at a straight forward travelling position.

On the other hand, during stoppage of the vehicle, when the steering wheel 1 is turned in a clockwise direction (or in a counterclockwise direction), a steering force of the steering wheel 1 is transmitted to the input shaft 3 and a relative rotational displacement is caused between the input shaft 3 and the pinion shaft 4. As a result, the pressure of the pressure chamber 7c (or 7b) of the energizing cylinder 7 becomes high as compared with the opposite pressure chamber 7b (or 7c) and the piston rod 7a is moved to the right (or to the left). Accordingly, a required steering assisting force is generated and the turning of the steering wheel while the vehicle is stopped can be performed with a light force.

When the vehicle starts travelling from the stopped condition and when the vehicle speed detection value V detected by the vehicle speed sensor 40 is increased, the exciting current i supplied from the controller 41 is decreased and the control rod 24a of the solenoid 24 in the variable orifice valve 20 is withdrawn. Accordingly, an opening area of the variable orifice VO constituted by the extreme end of the control rod 24a and the large inner diameter portion 30i of the spool 23 becomes wide and the pressure $P_2$ of the second pressure chamber 30m is decreased resulting in a decrease of the thrust moving the spool 23 to the left. As a result, the spool 23 is moved to the right and the opening area of the variable orifice VO is decreased. Thus, the pressure of the second pressure chamber 30m is increased and the movement of the spool 23 is stopped in the condition which satisfies the relationship in equation (1).

In this manner, as the vehicle speed detection value V of the vehicle speed sensor 40 increases, the spool 23 is moved to the right and the communication between the reaction force output port 25d and the return port 25c is interrupted. Instead, the reaction force output port 25d and the pressure chamber 30n are brought into communication with each other. Accordingly, the pressure $P_n$ of a third pressure chamber 30n is increased with an increase of a variable orifice opening area formed by the annular groove 28e of the sleeve 22 and the chamfered portion 30h of the spool 23 and, thus, the pressure $P_n$ of the third pressure chamber 30n is increased in correspondence to the increase of the vehicle speed detection value V. Thus, a reaction force hydraulic pressure $P_R$ output from the reaction force output port 25d to the reaction force chambers 9a and 9b of the steering reaction force generating mechanism 8 is increased. In this condition, since the reaction force chambers 9a and 9b of the steering reaction force generating mechanism 8 are in communication with each other by the annular groove 9c, the pressures of both of the reaction force chambers 9a and 9b are equally increased. At this time, when the steering wheel in not turned, since no relative rotational displacement is caused between the input shaft 3 and the pinion shaft 4, the plungers 12a to 12d are respectively urged toward the control arms 13a and 13b of the input shaft 3 and the engaging projections 14 are respectively engaged with corresponding control arms 13a and 13b. From this condition, when the steering wheel is turned in a clockwise direction (or counter-clockwise direction), the input shaft 3 turns in a clockwise direction as viewed in FIG. 2. However, since the plungers 12a and 12d are respectively in abutment with side surfaces in the clockwise direction of the control arms 13a and 13b, respectively, a thrust expressed by $P_R \times A_P$ is generated in each of the plungers 12a and 12d, where $P_R$ is the reaction force hydraulic pressure in the reaction force chambers 9a and 9b, and $A_P$ is the sectional area of the plungers 12a and 12d. As a result, a force couple is imparted to the input shaft 3 by the plungers 12a and 12d in a direction opposite to the steering direction and, thus, a steering reaction force to suppress the rotation of the input shaft 3 can be generated.

Figure 6:
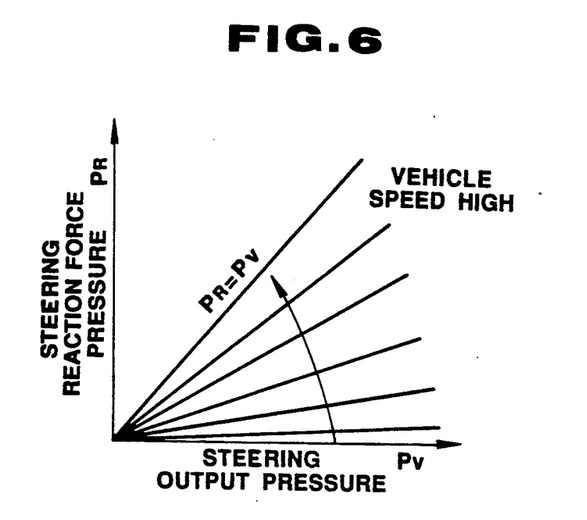
FIG. 6 is a diagram showing a relationship between a steering reaction force pressure and a steering output pressure as a parameter of the detected vehicle speed.

Since this steering reaction force is increased in correspondence to an increase of the steering output pressure $P_V$ supplied to the steering force control valve 2, a relation between the steering force control valve 2 and the steering reaction force pressure $P_R$ is as shown in FIG. 6. Namely, assuming that the steering output pressure $P_V$ is constant, the steering reaction force pressure $P_R$ increases with increasing vehicle speed detection value V and the steering reaction force pressure $P_R$ increases with increasing steering output pressure $P_V$.

Accordingly, when the vehicle is travelling at high speeds, since the steering reaction force pressure $P_R$ increases in response to the steering output pressure $P_V$, at this time, the steering reaction force generated by the plungers 12a and 12d (or 12b and 12c) of the steering reaction force generating mechanism 8 is also increased. Thus, the steering or turning of the steering wheel becomes heavy and optimum steering feeling corresponding to the vehicle speed can be obtained. At the same time, it is possible to prevent a drift condition or a spin condition of the vehicle from being caused due to cornering exceeding its limit by rapidly turning the steering wheel while the vehicle is travelling at high speeds.

As described in the foregoing, in this embodiment, the amount of displacement x (advance and retreat) of the control rod 24a of the solenoid 24 in the variable orifice valve 20 is controlled in accordance with the vehicle speed detection value V from the vehicle speed sensor 40 and, in accordance with this displacement x of the control rod 24a, the opening area of the variable orifice VO formed by the control rod 24a and the large inner diameter portion 30i of the spool 23 is varied. As a result, a pressure difference is caused between the first pressure chamber 30o and the second pressure chamber 30m which are adjacent to each other, with the piston portion 30a of the spool 23 interposed therebetween. The spool 23 is moved by a thrust corresponding to the pressure difference. Therefore, assuming that dust is adhered to the sliding surface between the sleeve 22 and the spool 23 and the sliding resistance of the spool 23 is increased, for example, when the control rod 24a is withdrawn by an increase of the vehicle speed detection value V, first, by the retreat of the control rod 24a, the opening area of the variable orifice VO formed by this control rod 24a and the large inner diameter portion 30i of the spool 23 is increased. In response to this increase, the pressure of the pressure chamber 30m is lowered and, on the other hand, the pressures of the pressure chambers 30n and 30o are raised. As a result, the pressure difference between the first pressure chamber 30o and the second pressure chamber 30m which are adjacent to each other, with the piston portion 30a of the spool 23 interposed therebetween, is increased and the thrust due to the pressure $P_1$ of the first pressure chamber 30o is increased. Thus, the spool 23 can be moved to the right against the high sliding resistance.

Conversely, when the vehicle speed detection value V is decreased and the control rod 24a is advanced, the large inner diameter portion 30i of the spool 23 is blocked by the advancement of the control rod 24a. Thus, the pressure $P_2$ of the second pressure chamber 30m is raised and, on the other hand, the pressures $P_1$ of the pressure chambers 30n and 30o are decreased. The thrust by the pressure $P_2$ of the pressure chamber 30m is increased and the spool 23 can be moved to the left against the high sliding resistance.

Furthermore, the plungers 12a to 12d which constitute the steering reaction force generating mechanism 8 are respectively disposed in the through bores 11a to 11d respectively formed between the reaction force chamber 9a and the recessed portion 10b for accommodating the control arm 13a, between the reaction force chamber 9b and the recessed portion 10b, between the reaction force chamber 9a and the recessed portion 10c for accommodating the control arm 13b, and between the reaction force chamber 9b and the recessed portion 10c. By virtue of this, the through bores 11a to 11d can be ground straightly and, at the same time, since each of the plungers 12a to 12d has a column shape, the grinding of their outer peripheral surfaces can be achieved easily and accurately such that the operation of the plungers 12a to 12d becomes smooth.

In the embodiment described above, although the plungers 12a to 12d are formed with circular through bores 15, the through bores 15 are not limited to this shape and through bores having an oblong shape, an elliptical shape, a square shape, and the like may be used.

In the above embodiment, although the control arms 13a and 13b are formed on the input shaft 3, and the reaction force chambers 9a and 9b and the plungers 12a to 12d are formed in the pinion shaft 4, the formation of these members may be reversed, and the reaction force chambers 9a and 9b and the plungers 12a to 12d may be formed in the input shaft 3, and the plungers 12a to 12d may be formed in the pinion shaft 4.

Furthermore, in the above embodiment, although it is described that the control rod 24a of the solenoid 24 is inserted into the large inner diameter portion 30i of the spool 23, the present invention is not limited to this and the variable orifice VO may be formed in which a recessed portion is formed in an end surface of the control rod 24a and an end portion of the spool 23 is inserted into the recessed portion.

Furthermore, in the above embodiment, although the control rod 24a is advanced and withdrawn by the solenoid 24, the control rod 24a may be advanced and withdrawn by a feed screw mechanism including a screw shaft driven by a motor and a nut which is threaded about the screw shaft. Alternatively, the control rod 24a may be advanced and withdrawn by a pinion driven by a driving motor and a rack shaft engaged with the pinion. Other linear movement mechanisms may also be used.

Furthermore, in the above embodiment, although it is described as to the case in which the return spring is contained in the solenoid 24, the return spring may be omitted.

Also, in the above embodiment, although the coil spring 30k for urging the spool 23 to the right is provided, instead of this, a thrust difference between the pressure chambers 30m and 30o which are adjacent to each other, with the piston portion 30a of the spool 23 interposed therebetween, may be used by making a sectional area Ao of the pressure chamber 30o larger than a sectional area Am of the pressure chamber 30m.

The present invention provides the following advantages.

In one aspect of the present invention, in the steering force control apparatus of a power steering system, the steering reaction force generating mechanism includes control arms formed on one of the input shaft and the output shaft, accommodating sections for accommodating the control arms formed between a pair of reaction force chambers, plungers slidably disposed in through bores formed between the reaction force chambers and the accommodating sections, and movement restricting pins inserted into through bores formed in the plungers so that the movement of the plungers is restricted by the pins. By virtue of this structure, the inner peripheral surfaces of the through bores accommodating the plungers can be ground straightly and the grinding can be achieved easily and accurately. Thus, the operation of the plungers becomes smooth.

In another aspect of the invention, in the steering force control apparatus of a power steering system, the fluid control valve for controlling working fluid supplied to the steering reaction force generating mechanism includes a spool slidably disposed in the housing, a first pressure chamber formed at the side of one end of the spool, a second pressure chamber formed adjacent to the first pressure chamber interposing a partition wall formed on the spool, a fluid passage formed in the spool for communicating the second pressure chamber with a steering force control valve and with the first pressure chamber, and a variable choke formed by the fluid passage and a control rod whose position is controlled in accordance with a control signal. By virtue of this structure, the spool can be made to slide due to a pressure difference between the first pressure chamber and the second pressure chamber, which pressure difference is caused by the variable choke formed by the fluid passage and the control rod. Thus, even when the sliding resistance of the spool is increased due to adherence of dust or the like, the spool can slide smoothly without being disturbed.

What is claimed is:

1. In a power steering system having an output shaft connected to a steering mechanism, an input shaft connected to the output shaft so as to be relatively displaceable in accordance with a steering torque applied to the output shaft, a steering assisting force generating mechanism for generating a steering assisting force in accordance with a relative displacement between the input shaft and the output shaft, a steering reaction force generating mechanism formed between the input shaft and the output shaft, and a control apparatus for controlling the steering assisting force generating mechanism and the steering reaction force generating mechanism, the improvement comprising:

the steering reaction force generating mechanism including:
a pair of reaction force chambers formed in a confronting surface of one of the input shaft and the output shaft;
an accommodating section formed between the reaction force chambers for oscillatably accommodating a control arm which is protrudingly formed on the other of the input shaft and the output shaft;
through bores respectively formed between one of the reaction force chambers and the accommodating section, and between the other of the reaction force chambers and the accommodating section;
plungers respectively disposed in the through bores so as to be slidable in an axial direction; and
a movement restricting mechanism including further through bores formed respectively in the plungers penetrating in a direction orthogonal to the axial direction of the plungers, and movement restricting pins respectively inserted into the further through bores to restrict movement of the plungers in the axial direction.

2. The improvement in a power steering system according to claim 1 wherein the control apparatus comprises:
a fluid control valve for working fluid to the steering assisting force generating mechanism and the steering reaction force generating mechanism; and
a controller for controlling the fluid control valve in accordance with a detection signal from a detecting means, the detecting means detecting a physical quantity factor which is varied depending on travelling and steering conditions of a vehicle in which the power steering system is mounted;
the fluid control valve including:
a spool slidably disposed in a housing,
a first pressure chamber and a second pressure chamber adjacent to each other and interposed by a partition wall formed on the spool, the first pressure chamber being supplied with the working fluid which is supplied to the steering assisting force generating mechanism and the second pressure chamber being supplied with a supply fluid from a pump,
a fluid passage formed in the spool and disposed in communication with the second pressure chamber, the fluid passage supplying the working fluid to the steering assisting force generating mechanism, and
a variable orifice formed by the fluid passage and a control rod whose position is controlled by a control signal from the controller.

3. In a power steering system having an output shaft connected to a steering mechanism, an input shaft connected to the output shaft so as to be relatively displaceable in accordance with a steering torque applied to the output shaft, a steering assisting force generating mechanism for generating a steering assisting force in accordance with a relative displacement between the input shaft and the output shaft, a steering reaction force generating mechanism formed between the input shaft and the output shaft, and a control apparatus for controlling the steering assisting force generating mechanism and the steering reaction force generating mechanism, the improvement comprising:
the control apparatus including:

a fluid control valve for supplying working fluid to the steering assisting force generating mechanism and the steering reaction force generating mechanism; and a control rod whose position is controlled in accordance with a detection signal from a detecting means, the detecting means detecting a physical quantity factor which is varied depending on travelling and steering conditions of a vehicle in which the power steering system is mounted;

the fluid control valve including:

a housing;

a sleeve disposed in the housing; and a spool slidably disposed in the sleeve so that one end of the spool confronts and approaches the control rod, the spool forming a first variable orifice between the spool and the sleeve for controlling the working fluid supplied to the steering reaction force generating mechanism;

a first pressure chamber and a second pressure chamber partitioned by a partition wall provided on the other end of the spool, the first pressure chamber being located at a side opposite to the spool and the second pressure chamber being located at a side of the sleeve with respect to the partition wall; and a second variable orifice formed between the second pressure chamber and the control rod for controlling a pressure of the second pressure chamber in cooperation with the control rod;

wherein supply fluid is supplied to the second pressure chamber from a pump, and output fluid of the second variable orifice is supplied to the first variable orifice, the first pressure chamber, and the steering assisting force generating mechanism.

4. The improvement in a power steering system according to claim 3, wherein:

the spool includes:

an inserted portion which is inserted into the sleeve;

the partition wall provided on an end of the inserted portion, at an opposite side to the control rod, the partition wall partitioning the first chamber and the second chamber; and a fluid passage formed axially through the inserted portion, the fluid passage having one end which opens to the second pressure chamber and having the other end opening at an end of the control rod so that the second variable orifice is formed by the other end of the fluid passage and the control rod.

* * * * *